US006038205A

United States Patent [19]

Katakura et al.

[11] Patent Number: 6,038,205

[45] Date of Patent: Mar. 14, 2000

[54] SPINDLE MOTOR

[75] Inventors: Koichi Katakura; Masaaki Satoh, both of Nagano, Japan

[73] Assignee: Sankyo Seiki Mfg. Co., Ltd., Nagano-ken, Japan

[21] Appl. No.: 08/796,801

[22] Filed: Feb. 6, 1997

[30] Foreign Application Priority Data

Feb. 8, 1996 [JP] Japan .................................... 8-022472

[51] Int. Cl.[7] ............................ G11B 23/00; G11B 17/02

[52] U.S. Cl. ......................................... 369/266; 360/99.08

[58] Field of Search ......................... 369/266; 360/98.07, 360/98.08, 99.08; 384/446, 493

[56] References Cited

U.S. PATENT DOCUMENTS

| | | | |
|---|---|---|---|
| 4,907,897 | 3/1990 | Shirotori | 384/446 |
| 4,984,909 | 1/1991 | Shirotori | 384/493 |
| 5,051,853 | 9/1991 | Hosoya | 360/98.07 |

FOREIGN PATENT DOCUMENTS

| | | |
|---|---|---|
| 6-36374 | 5/1994 | Japan . |
| 7-26962 | 5/1995 | Japan . |

*Primary Examiner*—Allen T. Cao
*Attorney, Agent, or Firm*—McAulay Nissen Goldberg Kiel & Hand, LLP

[57] ABSTRACT

A spindle motor comprises a fixed journal, a hub for loading disks, a ball bearing for rotatably supporting the hub and an annular member fixed on one of the fixed journal and the hub. The fixed annular member is configured to create to create a small space with the hub or fixed journal which is opposite the one on which the annular member is fixed. When L1 is the dimension of a space between a top surface of a top disk and a surface of a member facing said top surface of said top disk, and L2 is the dimension of a space between a bottom surface of a bottom disk and a surface of a member facing the bottom surface of the bottom disk, the annular member has grooves for generating air flow directed toward the space of longer dimension, one of said dimensions L1 and L2.

7 Claims, 5 Drawing Sheets

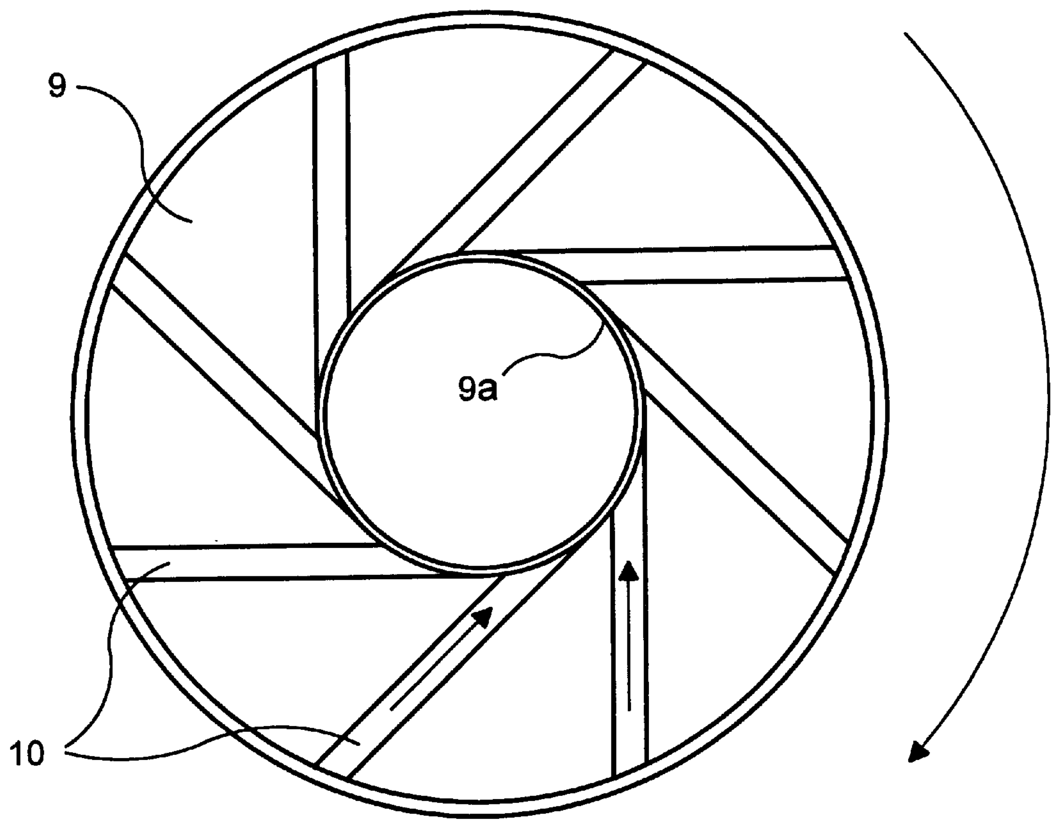
F I G. 3A
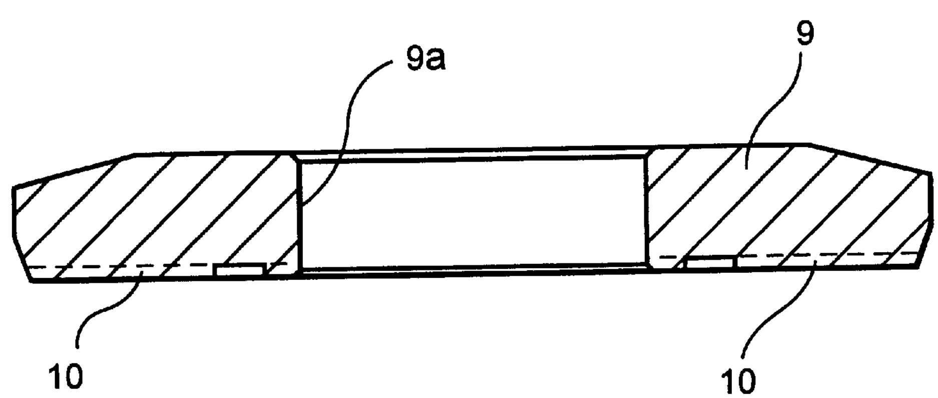
F I G. 3B

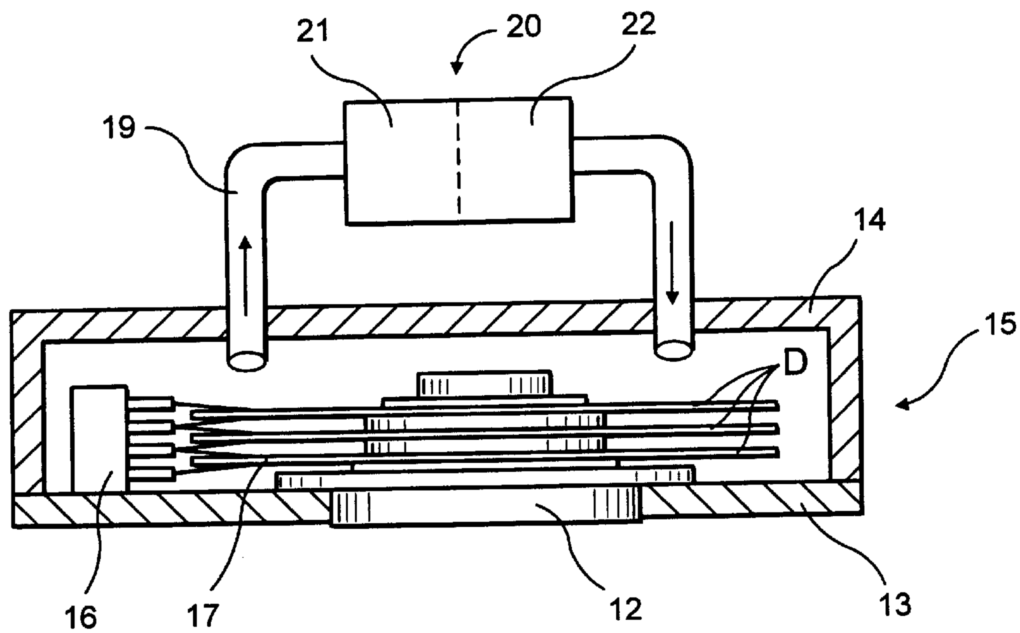
F I G. 6
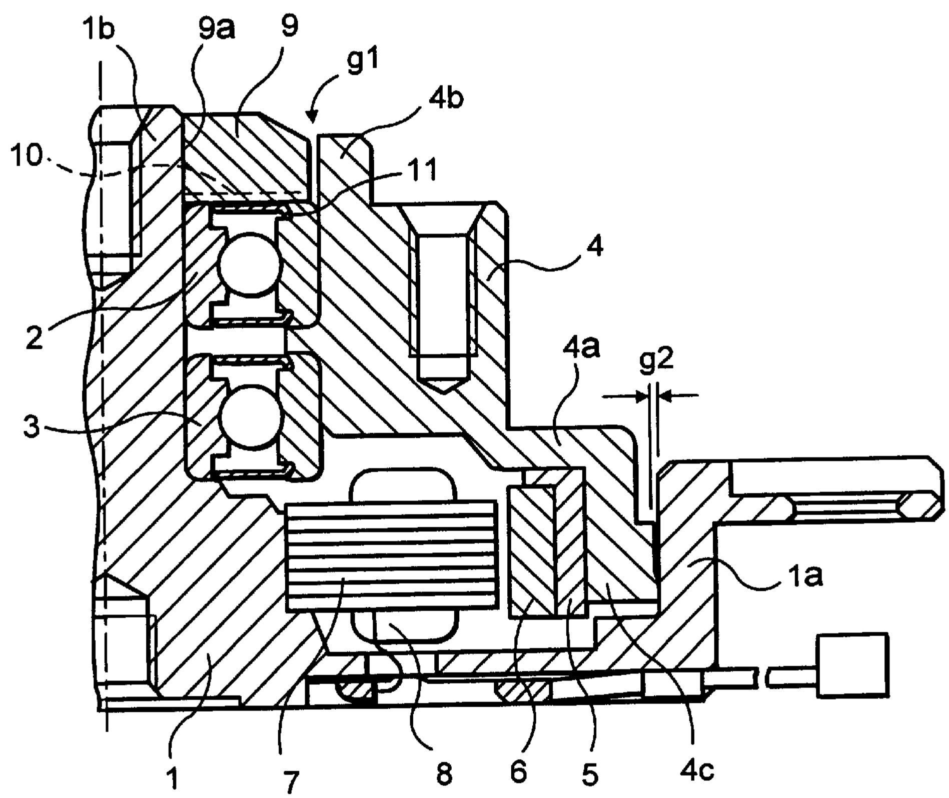
F I G. 7

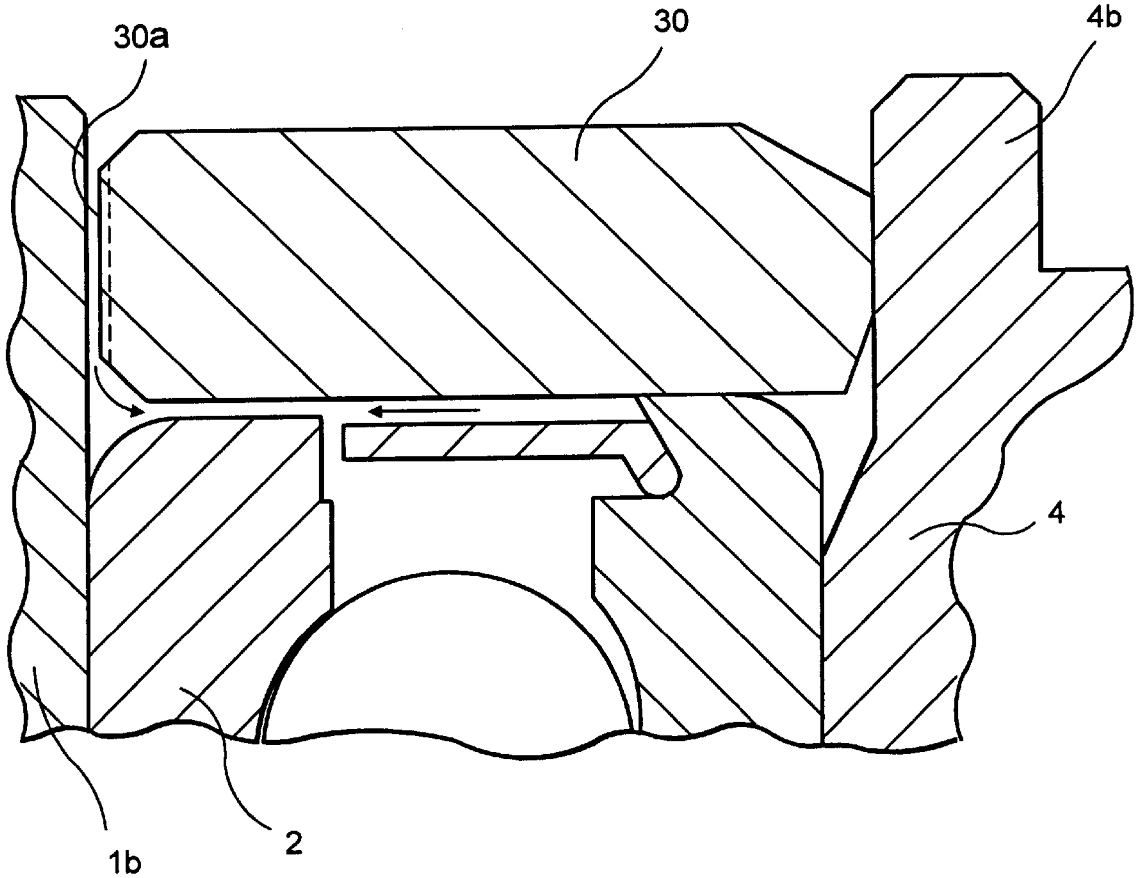
F I G. 8
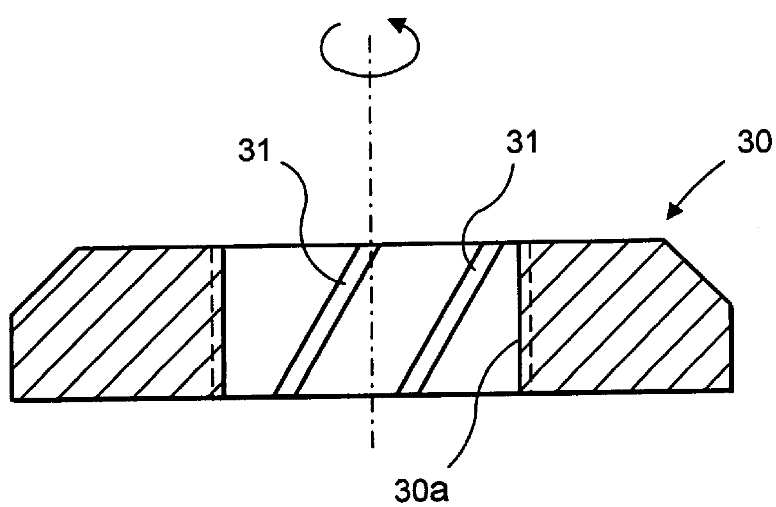
F I G. 9

SPINDLE MOTOR

BACKGROUND OF THE INVENTION a) Field of the Invention

This invention relates to a spindle motor for driving a hub on which a disk is loaded, and is applicable to various driving apparatus for, for example, a hard disk, optical disk, and other disks, a polygon mirror driving apparatus, and the like.

b) Description of the Related Art

Driving apparatus for various disks and polygon mirrors drive a hub loaded with a disk, using a spindle motor; however, particles generated in the spindle motor may flow outside of the motor, attaching to the surface of the disk, affecting the functions of the disk such as writing and reading of signals and being a medium for optical reflection, and worse, damaging a playback head. There are spindle motors having labyrinth structures in which small air paths are provided at the top and bottom of the motor and between a rotary member and a fixed member, and are curved multiple times in order to prevent particles generated in the spindle motor from flowing outside of the motor. Japanese Utility Model No. H07-26962 and Japanese Utility Model No. H06-36374 disclose the example of the kind.

In recent years, as high speed and high capacity magnetic disk drives have become common and the reduction of particles generated in the spindle motor is a must, the required level of reduction has become so stringent that the conventional labyrinth structure is not able to fulfill the demand. Particularly when the working temperature for a motor is set to, for example, between 0° C. and 55° C., at 55° C., the highest temperature, oil mist of lubrication grease having about 0.1 $\mu$m of particle size is generated at a bearing; therefore, the labyrinth structure in a conventional spindle motor does not fully prevent particles, not meeting the required level of particle prevention.

FIG. 1 of Japanese Utility Model No. H06-36374 discloses a method for preventing particles from contaminating the space where a disk is loaded, wherein the facing planes 32 and 33 are closely provided between a hub 25 on which a disk is loaded and a frame 21 rotatably supporting the hub; and spiral grooves 34 for generating the air flow directed toward the internal space of the motor when the hub rotates are formed on a holder section 30 between the facing planes.

However, the air flow generated in the motor is not constant; only generating an air flow toward the inside of the motor cannot completely prevent the air contaminated with oil mist and particles from flowing out outside of the motor, and it is difficult to reduce the particle contamination to meet the current level of requirement.

OBJECT AND SUMMARY OF THE INVENTION

This invention aims to break through the technical limits of the above mentioned conventional technology, providing a spindle motor in which the air flow generated in the motor is more precisely controlled to eliminate air flow in and out of the motor, and to assure that oil mist and particles flowing out with the air flow does not contaminate the disk causing damage.

In accordance with the invention, a spindle motor comprises a fixed journal, a hub for loading disks, a ball bearing for rotatably supporting the hub and an annular member fixed on one of the fixed journal and the hub. The fixed annular member is configured to create a small space with the hub or fixed journal which is opposite the one on which the annular member is fixed. When L1 is the dimension of a space between a top surface of a top disk and a surface of a member facing said top surface of said top disk, and L2 is the dimension of a space between a bottom surface of a bottom disk and a surface of a member facing the bottom surface of the bottom disk, the annular member has grooves for generating air flow directed toward the space of longer dimension, one of said dimensions L1 and L2.

BRIEF DESCRIPTION OF THE DRAWINGS

In the drawings:

FIGS. 3A and 3B show an annular member of the spindle motor of this invention: FIG. 3A shows its plan view; FIG. 3B shows its cross section;

FIG. 6 is a cross section showing an embodiment of a detector for measuring the effect of this invention;

FIG. 7 is a cross section showing another embodiment of a spindle motor of this invention;

FIG. 8 is a cross section showing a major section of another embodiment of a spindle motor of this invention; and FIG. 9 shows an annular member of another embodiment of a spindle motor of this invention.

DESCRIPTION OF THE PREFERRED EMBODIMENTS

Figure 1:
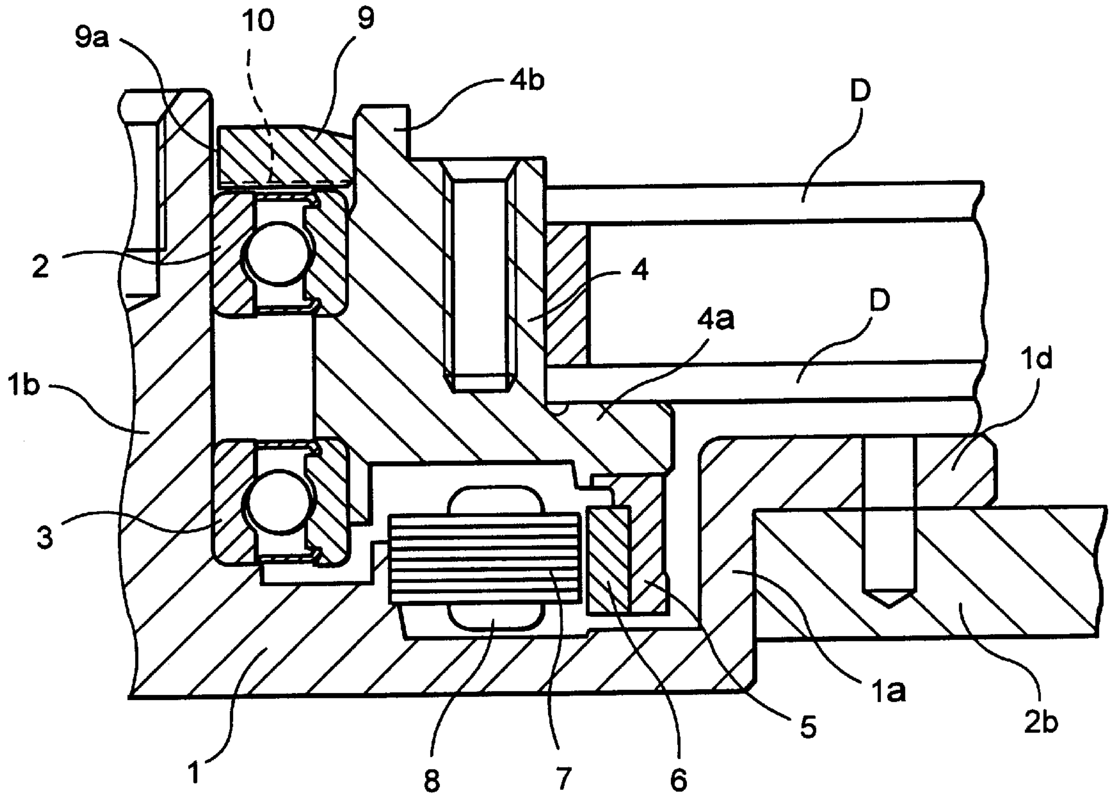
FIG. 1 is a cross section showing an embodiment of a spindle motor of this invention.

Embodiments of a spindle motor of this invention are described hereinafter referring to the drawings.

Figure 2:
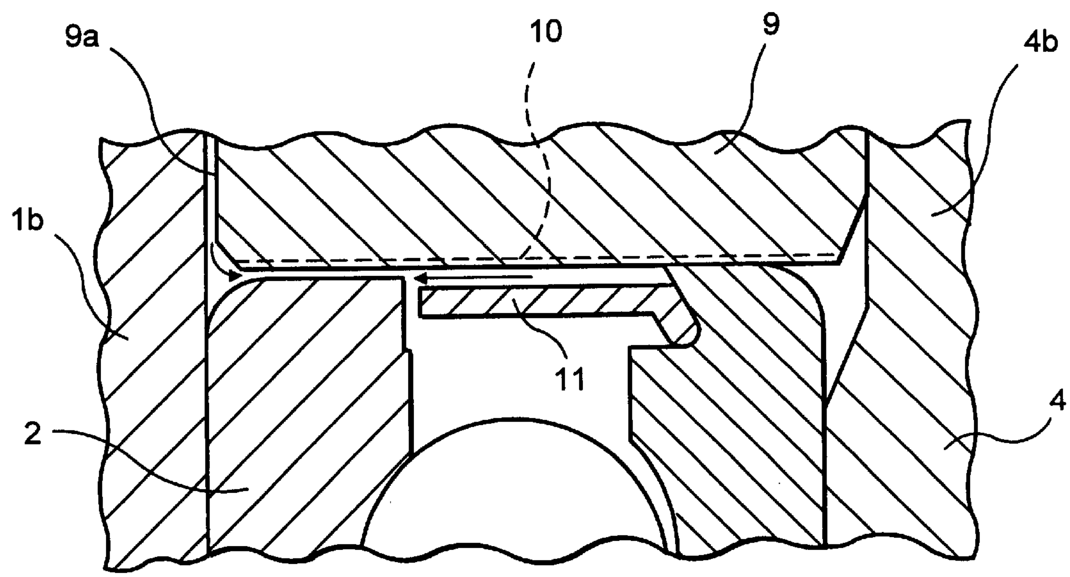
FIG. 2 is a cross section showing a magnified major section of the spindle motor shown in FIG. 1.

In FIGS. 1 and 2, frame 1 is formed integrally with a peripheral wall 1*a* around the circumference and with a flange 1*d* for fixing the motor to a chassis 26 and the like of an apparatus body, following the peripheral wall 1*a*. At the center of the frame 1, a fixed journal 1*b* is integrally formed standing upwardly. In the embodiment shown in the figure, the fixed journal 1*b* is integrally molded with the frame 1, but it may be fixed to the frame 1 by press-fitting and the like. The inner rings of ball bearings 2 and 3 are arranged with a space interposed therebetween and fitted and secured to the fixed journal 1*b*. The outer ring of each of the ball bearings 2 and 3 is fitted to an inner hole of the hub 4 rotatably supported with respect to the frame 1 through the ball bearings 2 and 3.

The hub 4 has an outward flange portion 4*a* for loading a disk D such as a hard disk, provided axially at the lower side in FIG. 1, and has a cylindrical member 4*b* provided at the circle of the inner hole at the top. An annular rotor yoke 5 is secured underneath the bottom surface of the flange portion 4*a* of the hub 4 by caulking or other proper means, and an annular drive magnet 6 is secured to the inner circle surface of the rotor yoke 5. A stator core 7 is fixed to the frame 1. The stator core 7 has a proper number of salient-poles facing the outer circle in the radial direction, around which a drive coil 8 is wound. The outer circle surface of each of the salient-poles faces the inner circle surface of the drive magnet 6 with a proper space interposed therebetween. Therefore, power is turned on and off for each phase of the drive coil 8 according to the rotational position of the drive magnet 6, and thereby, the rotary section including the drive magnet 6, the hub 4, and the disk D mounted on the hub 4 can be continuously rotated.

As shown in detail in FIG. 2, an annular member 9 is fitted and secured to the inner circle of the cylindrical member of the hub 4. The inner circle surface 9*a* of the annular member 9 faces the outer circle surface of the fixed journal 1*b* with about 10 μm to 100 μm of small space interposed therebetween, and the function of a labyrinth is provided therein. A part of the bottom surface of the annular member 9 contacts the top surface of the outer ring of the upper ball bearing 2, and faces the top surface of the inner ring of the ball bearing 2 with a small space interposed therebetween. A sealing member 11 is provided at the end of the ball bearing 2 to prevent oil mist and particles generated in the ball bearing 2 from flowing outside of the bearing 2; it faces the bottom surface of the annular member 9 with a small space interposed therebetween.

On the bottom surface of the annular member 9 in FIG. 2, that is, the end surface facing the ball bearing 2, grooves 10 consisting of a plurality of spiral lines are formed for generating an air flow directed opposite the air flow generated in the spindle motor when the hub 4 rotates. Each of the spiral grooves 10 is formed such that it extends from the outer circle side to the inner circle side of the annular member 9, inclining with respect to a line in the radial direction by a predetermined angle. In an example shown in FIG. 3, air flows radially from the outer side to the inner side when the motor rotates clockwise as shown by the arrows. In the embodiment shown in FIGS. 1 and 2, the surface on which the spiral grooves 10 of the annular member 9 is formed faces the top surface of the ball bearing 2. In the embodiment shown by the figures, each of the eight spiral grooves 10 has a width of 0.5 mm and a depth of 0.1 mm. The material used for the annular member 9 is freely selected, and may include, for example, aluminum, stainless steal, sintered metal, and the like. In this embodiment, the annular member 9 and the fixed journal 1*b* are made of materials with almost the same thermal expansion coefficients so that the space between the inner circle surface 9 of the annular member 9 and the outer circle surface of the fixed journal 1*b* does not vary due to temperature changes.

Figure 4:
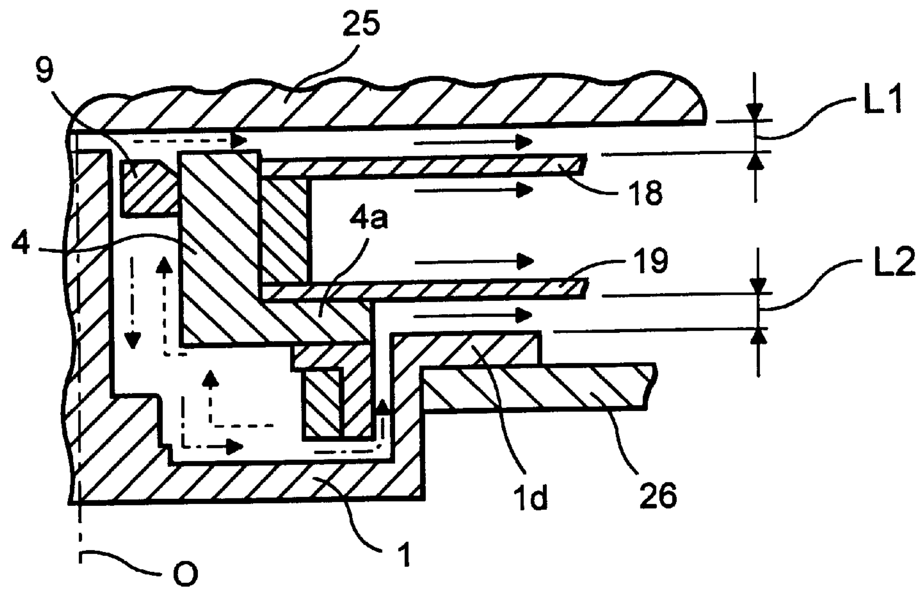
FIG. 4 is a cross section showing the generation of air flow in a spindle motor.

Next, the air flow generated in the spindle motor when the disk D rotates is described referring to FIG. 4.

In FIG. 4, element 4 is a hub which is rotatably supported around a rotation axis O against frame 1 through a proper bearing (not illustrated). To the flange portion 4*a* of the hub 4 is mounted arbitrary number of disks (e.g., hard disk) 18 and 19 to be rotated with the hub 4. An annular member 9 is arranged such that it is closer to the space between the top surface of the top disk 18 and the surface 25 of the member facing thereto than the ball bearing (see FIGS. 1 and 2) in the air path as shown in FIG. 4. The flange 1*d* of the frame 1 is mounted on a lower chassis of the body of the disk driving apparatus.

In this spindle motor, with an arbitrary number of disks (two pieces in FIG. 4), the top disk 18 faces, in parallel, the bottom surface of the upper chassis 25 of the body of the disk driving apparatus; the distance between the mutual facing surfaces is L1. Also the bottom surface of the bottom disk 19 faces, in parallel, the top surface of the flange 1*d* of the frame 1; the mutual distance between the mutual facing surfaces is L2. Note that when only one disk is loaded, the distance between one of the disk surface and its facing surface is L1; that between the other disk surface and its facing surface is L2. When the disks 18 and 19 are rotated with the hub 4, the air around the disks 18 and 19 moves in the rotational direction of the disks 18 and 19, generating the air flow moving from the inner periphery to the outer periphery of the disks 18 and 19 by centrifugal force. If the relation between L1 and L2 is L1<L2,the flow rate and velocity of the air flow on the L1 side become larger and, therefore, surpass those of the air flow on the L2 side; the air flow inside of the motor takes the course of flowing in from the L2 side and out through the L1 side. This flow pattern is shown by arrows of dashed lines in FIG. 4. On the other hand, if the relation is L1>L2,the air flow on the L2 side surpasses that on the L1 side; the air flow inside of the motor takes a path, flowing in from the L1 side and out to the L2 side. This flow pattern is shown by one-dotted lines in FIG. 4.

Figure 5:
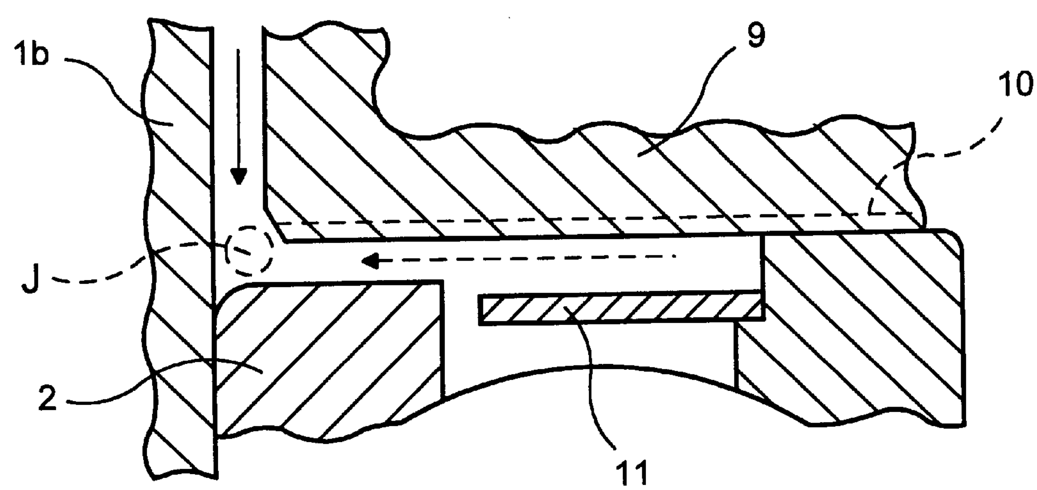
FIG. 5 is a cross section showing an example of air flow in a spindle motor.

Now if the relation between L1 and L2 is L1>L2, the air flow is generated by the rotation of the disks 18 and 19 such that the air inside of the motor is sucked out of the space between the bottom disk 19 and the frame 1, and sucked into the inside of the motor from the space between the inner circle surface 9*a* of the annular member 9 and the outer circle surface of the fixed journal 1*b*. The spiral grooves 10 formed on the annular member 9, as described with FIG. 3, work such that it generates an air flow moving radially from the outer side toward the inner side. Therefore, as shown in FIG. 5, the air flow generated by the spiral grooves 10 moves in the opposite direction to the air flow generated inside of the motor when the hub 4 and the disks 18 and 19 rotate, thus mutually canceling both air flows at the section coded by J, and air flow moving in and out of the motor is eliminated. As a result, even when oil mist and particles are generated inside of the motor, specifically, in the ball bearings 2 and 3, they do not contaminate the disks outside, preventing the disks from unfavorable performance resulting from the oil mist and particle contamination.

In order to measure the effects of the above embodiment, the amount of the particles flowing out from the spindle motor is measured by a measuring apparatus shown in FIG. 6. In FIG. 6, a plurality of disks are loaded on the hub of the spindle motor 12; the spindle motor 12 is then installed in the disk driving apparatus 15 comprising a base plate 13 and a cover case 14 covered on top; two holes are formed on the cover case 14, which are connected to each other via a pipe 19; a particle detector 20 comprised of a particle amount measuring unit 21 and an air cleaning unit 22 is provided at the half way point of the pipe 19. The particle detector 20 sucks the air in side of the disk driving apparatus 15 from one end of the pipe, and measures the number of particles having a certain size or larger by the particle amount measuring unit 21. The particle amount measuring unit 21 will function using, for example, an infrared laser. The air in which the particle amount has been detected has its particles removed through the air cleaning section 22 and is returned to the inside of the disk driving apparatus. Element 17 is a magnetic head; element 16 is a head carriage.

The results obtained by measurements using the above detector are shown below. The results are obtained by measuring particles having 0.1 μm or more of particle size at 55° C. of ambient temperature. The units are particles/0.1 cf.

| the number of groove | 0 | 4 | 6 | 8 |
|---|---|---|---|---|
| the amount of generated particles | 4,000–20,00 | 50–200 | 30–50 | 10–30 |

The following is understood from the above measurements. By forming the spiral grooves 10 on the end surface of the annular member 9 on the ball bearing 2 side, for generating an air flow opposite the one generated in the spindle motor by the rotation of the hub 4, the amount of the particles flowing from inside of the spindle motor to the outside is apparently decreased. Also, by increasing the number of grooves 10, the effect of preventing particles is gained. However, if the air flow generated by the spiral grooves 10 is much stronger than that generated when the hub 4 rotates, it would cause contrary effects; therefore, a balance should be kept with the air flow generated when the hub 4 rotates.

Note that when the relation between the distances, L1 and L2, is reversed, i.e., L1<L2, the direction of the air flow generated when the hub 4 rotates is opposite that shown in FIG. 5. Accordingly, the spiral grooves 10 are formed so that the air flow generated by the spiral grooves 10 moves in the direction opposite that shown in FIG. 5. Specifically, the direction the grooves 10 extend may be inclined in reverse. Note that the direction the grooves 10 extend is determined by its combination with the rotational direction of the annular member 9. Each of the grooves 10 is not necessarily formed as a straight line, but it may be formed as an arc. Further, the width on the entrance side for the air may be made wider than that on the exit side.

The effect of an embodiment of this invention can be determined from the following measurement results. In other words, the identical annular members 9, on which spiral grooves as shown in FIG. 3, are installed in two spindle motors; one motor is configured such that the relation between the distances, L1 and L2, is L1>L2, and the other is configured to be L1<L2; the particle amount was measured using the detector shown by FIG. 6. Note that the number of spiral grooves is 4, but other measurement conditions remain the same as in the aforementioned measurement.

As a result of this measurement, the particle amount obtained from the motor which is configured to be L1>L2 was 171/0.1 cf; on the other hand, that obtained from the other motor which is configured to be L1<L2 was 431/0.1 cf. In other words, in the motor configured to be L1>L2, the direction of the air flow generated inside of the motor when the disk rotates is opposite that generated by the spiral grooves, canceling each other and preventing the particles generated in the motor from being carried by the air flow to the outside. In the other motor configured to be L1<L2, on the other hand, the direction of the air flow generated inside of the motor is the same as that generated by the spiral grooves, and the particles inside of the motor flow to the outside with the air flow.

In this embodiment, when L1>L2, the spiral grooves 10 formed on the annular member 9 are configured so as to generate the air flow directed from the internal space of the motor to the external space; when L1<L2, the spiral grooves 10 are configured so as to generate the air flow directed from the external space of the motor to the internal space. For this reason, the flow of air moving in and out of the motor, generated when the motor rotates, is decreased or disappears. Consequently, even if oil mist and particles are generated in the motor, particularly in the ball bearing, they do not contaminate the disks outside flowing in the air, thus preventing the damage which is normally caused by oil mist and particles attached to the disks.

Next, variously modified embodiments are described. The annular member 9 having the spiral grooves may be fitted and secured to the fixed journal 1*b*. In FIG. 7, the inner circle surface 9*a* of the annular member 9 is fitted and secured to the outer circle surface of the fixed journal 1*b*; a small space g1 is created between the outer circle surface of the annular member 9 and the inner circle surface of the cylindrical portion 4*b* of the hub 4 to constitute a labyrinth structure. The spiral grooves 10 as described in FIG. 3 are formed on the bottom surface of the annular member 9; the bottom surface of the annular member 9 on which the grooves 10 are formed faces the top surface of the outer ring of the ball bearing 2 and the sealing member 11 with an appropriate space. In the embodiment shown in FIG. 7, a small space g2 is formed between the inner circle surface of the peripheral wall 1*a* of the frame 1 and the outer circle surface of the peripheral wall 4*c* of the hub 4 to constitute a labyrinth structure. Other constructions remain the same as in the previous embodiment.

Also in this spindle motor, the spiral grooves 10 formed on the annular member 9 generate an air flow directed opposite the air flow generated in the motor when the hub 4 rotates. When the relation between the distances L1 and L2, which is described in FIG. 4, is L1>L2, and the air flow generated in the spindle motor when the hub 4 rotates takes the path of flowing into the motor from the space g1 and out of the motor from the space g2, the spiral grooves 10 are formed so as to generate the air flow directed from the inside of the motor to the outside of the motor through the space g1 when the ball bearing 2 and the sealing member 11 rotate.

When the relation between the spaces, L1 and L2, is L1<L2, on the other hand, and the air flow generated inside of the spindle motor when the hub 4 rotates takes the path of flowing into the motor from the space g2 and out of the motor from the space g1, the spiral grooves 10 are formed so as to generate the air flow directed from the inside of the motor toward the outside of the motor through the space g2. As described, even in the embodiment shown in FIG. 7, the air flow generated inside of the spindle motor when the hub 4 rotates can be canceled by the air flow generated by the spiral grooves 10; therefore, even if oil mist and particles are generated inside of the motor, there is no chance for them to be carried outside with the air flow and contaminate the rotary member outside, preventing the damage of the motor, which is normally caused by oil mist and particles contaminating the rotary member.

FIG. 8 shows another embodiment. In FIG. 8, an annular member 30 is fitted and secured by its outer circle surface to the inner circle surface of the cylindrical member 4*b* of the hub 4 so that it rotates integrally with the hub 4; the inner circle surface 30*a* of the annular member 30 faces the outer circle surface of the fixed journal 1*b* with about 10 $\mu$m to 100 $\mu$m of small space interposed therebetween. The annular member 30 has grooves 31 formed on its inner circle surface 30*a*, which can generate an air flow directed opposite that generated between the fixed journal 1*b* and the hub 4 when the hub 4 rotates, instead of having the spiral grooves 10 formed on its end surface on the ball bearing 2 side as in the previous embodiments.

FIG. 9 shows only the annular member 30 of this embodiment. Multiple grooves 31 are formed on the inner circle surface 30*a* of the annular member 30 at a predetermined interval circumferentially. These grooves 31 are formed with a fixed width and depth, and are inclined by a predetermined angle with respect to the axial direction. When the annular member 30 having such grooves 31 is rotated counterclockwise, by the effect of the grooves 31, an air flow is generated directed upwardly in the axial direction in the small space between the inner circle surface 30*a* of the annular member 30 and the outer circle surface of the fixed journal 1*b*. Accordingly, when the relation between the distances L1 and L2 is L1>L2, the air inside of the motor tries to flow out from the space between the bottom disk and the frame; therefore, the air flow directed downwardly in the axial direction is generated in the small space between the inner circle surface 30*a* of the annular member 30 and the outer circle surface of the fixed journal 1*b* when the disk rotates. However, the effect of the grooves 31 generates another air flow opposite the above air flow, that is, one directed upwardly in the axial direction, thus mutually canceling the air flows, and therefore, the air inside of the motor doe not flow out.

The direction of the generated air flow can be changed by inclining the grooves 31 to either one side or the other in the axial direction. When the relation between the distances, L1 and L2, is L1<L2, and the motor rotates counterclockwise, the direction the grooves 31 should be inclined is opposite those as shown in FIG. 9.

Note that when the number, depth, and width of the grooves 31 are constant, the degree of the generated air flow can be adjusted by varying the inclined angle of the grooves 31. Further, the pattern of the grooves is not limited to multiple linear lines, but the grooves may be spiral.

The invention devised by this inventor has been specifically described referring to the embodiments. However, this invention is not limited to the above embodiments, but, needless to say, it is modifiable in various ways within the scope of the invention. For example, the above embodiments have described a spindle motor to be used for driving hard disks and the like; however, the spindle motor of this invention can be applied to other apparatus such as a spindle motor for driving a rotary polygon mirror which normally has a problem of the generation of oil mist and particles, and thereby, the initial operation effect can be obtained. Needless to say, for the spindle motor for driving a rotary polygon mirror, the rotary polygon mirror corresponds to the disks referred to above.

In order to cancel the air flow generated inside of the motor when the disk rotates, the grooves 31 may be formed for generating the air flow at the circle surface of the annular member 9 which creates a small space with the outer circle surface of the fixed journal 1*b* or the inner circle surface of the cylindrical member 4*b* of the hub 4, and also the spiral grooves 10 may be formed at the end surface of the annular member 9 on the ball bearing side, and thereby, the air flow directed to actually cancel the air flow generated inside of the motor when the disks rotate may be generated.

Further, the grooves may be formed on the outer circle surface of the fixed journal 1*b* or the inner circle surface of the cylindrical member 4*b* of the hub 4, which creates a small space with the circle surface of the annular member 9, to generate the air flow directed in the direction to cancel the air flow generated in the motor when the disks rotate.

Moreover, in the above mentioned embodiments, the two ball bearings 2 and 3 are arranged axially above the stator core 7 as shown in FIG. 1, and the annular member 9 is arranged axially at the outer side of the ball bearing 2; however, the annular member can be arranged at the lower side of the ball bearing 3 in FIG. 1.

In a motor configured in that ball bearings are arranged axially at both sides sandwiching the stator core, the annular member may be arranged under the lower ball bearing, and then the grooves of this invention may be formed on the annular member.

According to this invention, grooves for generating an air flow in the direction opposite the air flow generated in the motor when disks are rotated are formed on the end surface of the annular member on the ball bearing side or the circle surface of the annular member to generate an air flow in the direction to actually cancel the air flow generated inside of the motor when the disks rotate. Therefore, the air flow in and out of the motor is eliminated or decreased. Consequently, even if oil mist and particles are generated inside of the spindle motor, in particular in the ball bearing, there is no chance for them to flow in the air and to contaminate the rotary body outside, thus preventing damage on the motor which is normally caused by the oil mist and particles attached to the rotary body.

While the foregoing description and drawings represent the preferred embodiments of the present invention, it will be obvious to those skilled in the art that various changes and modifications may be made therein without departing from the true spirit and scope of the present invention.

What is claimed is:

1. A spindle motor comprising:

a fixed journal;

a hub for loading disks;

a ball bearing for rotatably supporting said hub;

an annular member fixed on one of said fixed journal and said hub;

said fixed annular member being configured to create a small space with said hub or said fixed journal which oppsite the one on which said annular member is fixed;

wherein when L1 is the dimension of a space between a top surface of a top disk and a surface of a member facing said top surface of said top disk, and L2 is the dimension of a space between a bottom surface of a bottom disk and a surface of a member facing said bottom surface of said bottom disk, said annular member has grooves for generating air flow directed toward the space of longer dimension, one of said dimensions L1 and L2;

said annular member being arranged with respect to said ball bearings in an axial direction of said fixed journal, and being arranged close to the space created between the top surface of said top disk and the surface of the member facing said top surface of said top disk;

said annular member being fixed to said hub; when the relation between said L1 and L2 is L1>L2, said annular member having grooves on an end surface thereof on said ball bearing side for generating an air flow directed inwardly in the radial direction of said fixed journal; when L1<L2, said annular member having grooves on an end surface thereof on said ball bearing side for generating an air flow directed outwardly in a radial direction.

2. The spindle motor as set forth in claim 1, wherein said fixed journal, said hub, and said annular member are made of materials with almost the same thermal expansion coefficients.

3. A spindle motor comprising:

a fixed journal;

a hub for loading disks;

a ball bearing for rotatably supporting said hub;

an annular member fixed on one of said fixed journal and said hub;

said fixed annular member being configured to create a small space with said hub or said fixed journal which is oppsite the one on which said annular member is fixed;

wherein when L1 is the dimension of a space between a top surface of a top disk and a surface of a member facing said top surface of said top disk, and L2 is the dimension of a space between a bottom surface of a bottom disk and a surface of a member facing said bottom surface of said bottom disk, said annular member has grooves for generating air flow directed toward the space of longer dimension, one of said dimensions L1 and L2;

said annular member being fixed on said fixed journal; when the relation between said L1 and L2 is L1>L2, said annular member having grooves on an end surface thereof on said ball bearing side for generating an air flow directed outwardly in the radial direction of said fixed journal; when the relation is L1<L2, said annular member having grooves on an end surface thereof on said ball bearing side for generating an air flow directed inwardly in a radial direction.

4. A spindle motor comprising;

a fixed journal;

a hub for loading disks;

a ball bearing for rotatably supporting said hub;

an annular member fixed on one of said fixed journal and said hub;

said fixed annular member being configured to create a small space with said hub or said fixed journal which is oppsite the one on which said annular member is fixed;

wherein when L1 is the dimension of a space between a top surface of a top disk and a surface of a member facing said top surface of said top disk, and L2 is the dimension of a space between a bottom surface of a bottom disk and a surface of a member facing said bottom surface of said bottom disk, said annular member has grooves for generating air flow directed toward the space of longer dimension, one of said dimensions L1 and L2;

said annular member being arranged with respect to said ball bearings in an axial direction of said fixed journal, and being arranged close to the space created between the top surface of said top disk and the surface of the member facing said top surface of said top disk; and when the relation between said L1 and L2 is L1>L2, said annular member having grooves on an inner circle surface thereof for generating an air flow directed upwardly in the axial direction; and when L1<L2, said annular member having grooves on its inner circle surface thereof for generating an air flow directed downwardly in the axial direction.

5. A spindle motor comprising:

a fixed journal;

a hub for loading disks;

a ball bearing for rotatably supporting said hub;

an annular member fixed on one of said fixed journal and said hub;

said fixed annular member being configured to create a small space with said hub or said fixed journal which is oppsite the one on which said annular member is fixed;

wherein when L1 is the dimension of a space between a top surface of a top disk and a surface of a member facing said top surface of said top disk, and L2 is the dimension of a space between a bottom surface of a bottom disk and a surface of a member facing said bottom surface of said bottom disk, said annular member has grooves for generating air flow directed toward the space of longer dimension, one of said dimensions L1 and L2;

said annular member being arranged with respect to said ball bearings in an axial direction of said fixed journal, and being arranged close to the space created between the bottom surface of said bottom disk and the surface of the member facing the bottom surface of said bottom disk;

said annular member being fixed on said hub; and when the relation between said L1 and L2 is L1>L2, said annular member having grooves on an end surface thereof on said ball bearing side for generating an air flow directed outwardly in the radial direction of said fixed journal; and when L1<L2, annular member having grooves on an end surface thereof on said ball bearing side of generating an air flow directed inwardly in the radial direction of said fixed journal.

6. A spindle motor comprising:

a fixed journal;

a hub for loading disks;

a ball bearing for rotatably supporting said hub;

an annular member fixed on one of said fixed journal and said hub;

said fixed annular member being configured to create a small space with said hub or said fixed journal which is oppsite the one on which said annular member is fixed;

wherein when L1 is the dimension of a space between a top surface of a top disk and a surface of a member facing said top surface of said top disk, and L2 is the dimension of a space between a bottom surface of a bottom disk and a surface of a member facing said bottom surface of said bottom disk, said annular member has grooves for generating air flow directed toward the space of longer dimension, one of said dimensions L1 and L2;

said annular member being arranged with respect to said ball bearings in an axial direction of said fixed journal, and being arranged close to the space created between the bottom surface of said bottom disk and the surface of the member facing the bottom surface of said bottom disk;

said annular member being fixed to said fixed journal; and when the relation between said L1 and L2 is L1>L2, said annular member having grooves on an end surface thereof on said ball bearing side for generating an air flow directed inwardly in the radial direction of said fixed journal; and when L1<L2, said annular member having grooves on an end surface thereof on said ball bearing side of generating an air flow directed outwardly in the radial direction.

7. A spindle motor comprising:

a fixed journal;

a hub for loading disks;

a ball bearing for rotatably supporting said hub;

an annular member fixed on one of said fixed journal and said hub;

said fixed annular member being configured to create a small space with said hub or said fixed journal which is oppsite the one on which said annular member is fixed;

wherein when L1 is the dimension of a space between a top surface of a top disk and a surface of a member facing said top surface of said top disk, and L2 is the dimension of a space between a bottom surface of a bottom disk and a surface of a member facing said bottom surface of said bottom disk, said annular member has grooves for generating air flow directed toward the space of longer dimension, one of said dimensions L1 and L2;

said annular member being arranged with respect to said ball bearings in an axial direction of said fixed journal, and being arranged close to the space created between the bottom surface of said bottom disk and the surface of the member facing the bottom surface of said bottom disk;

said relation between L1 and L2 being $L1>L2$, said annular member having grooves on an outer circle surface thereof for generating an air flow directed upwardly in an axial direction; and when $L1<L2$, said annular member having grooves on an outer circle surface thereof for generating an air flow directed downwardly in the axial direction.

* * * * *